United States Patent [19]
Fullerton et al.

[11] 4,099,022
[45] Jul. 4, 1978

[54] SYSTEM FOR PULSE DATA TRANSMISSION THROUGH WATER-RETURN CABLES

[75] Inventors: Robert A. Fullerton, Agoura; George V. Podraza, Canoga Park, both of Calif.

[73] Assignee: Bunker Ramo Corporation, Oak Brook, Ill.

[21] Appl. No.: 757,034

[22] Filed: Jan. 5, 1977

[51] Int. Cl.$^2$ ............................................. H04L 25/02
[52] U.S. Cl. ..................................... 178/63 R; 340/2
[58] Field of Search ................. 179/1 UW; 178/63 R, 178/63 A, 63 B, 63 C, 63 D, 63 E, 63 F, 45; 340/2, 3 R, 3 T; 174/70 S

[56] References Cited
U.S. PATENT DOCUMENTS 3,444,508  5/1969  Granfors et al. .......................... 340/2

Primary Examiner—Thomas A. Robinson
Attorney, Agent, or Firm—F. M. Arbuckle; A. Freilich

[57] ABSTRACT

A system for data pulse transmission through a single-wire, water-return cable payed out from a coil in an open pack to any selected length over a predetermined wide range (e.g., 4K to 16K feet) employing a toroidal core around the cable near the pack and a multiturn primary winding on the core. The single-wire cable constitutes a single turn secondary winding terminated at the receiver end by a resistor and coupled to the water (circuit ground) at the transmitting end by stray capacitance between the cable remaining in the pack and the surrounding water. The receiver employs an equalizing network to compensate for the amplitude-frequency characteristic of the cable of nominal length within the predetermined range resulting in only slight over-compensation for a shorter cable length and slight under-compensation for a longer cable length.

12 Claims, 8 Drawing Figures

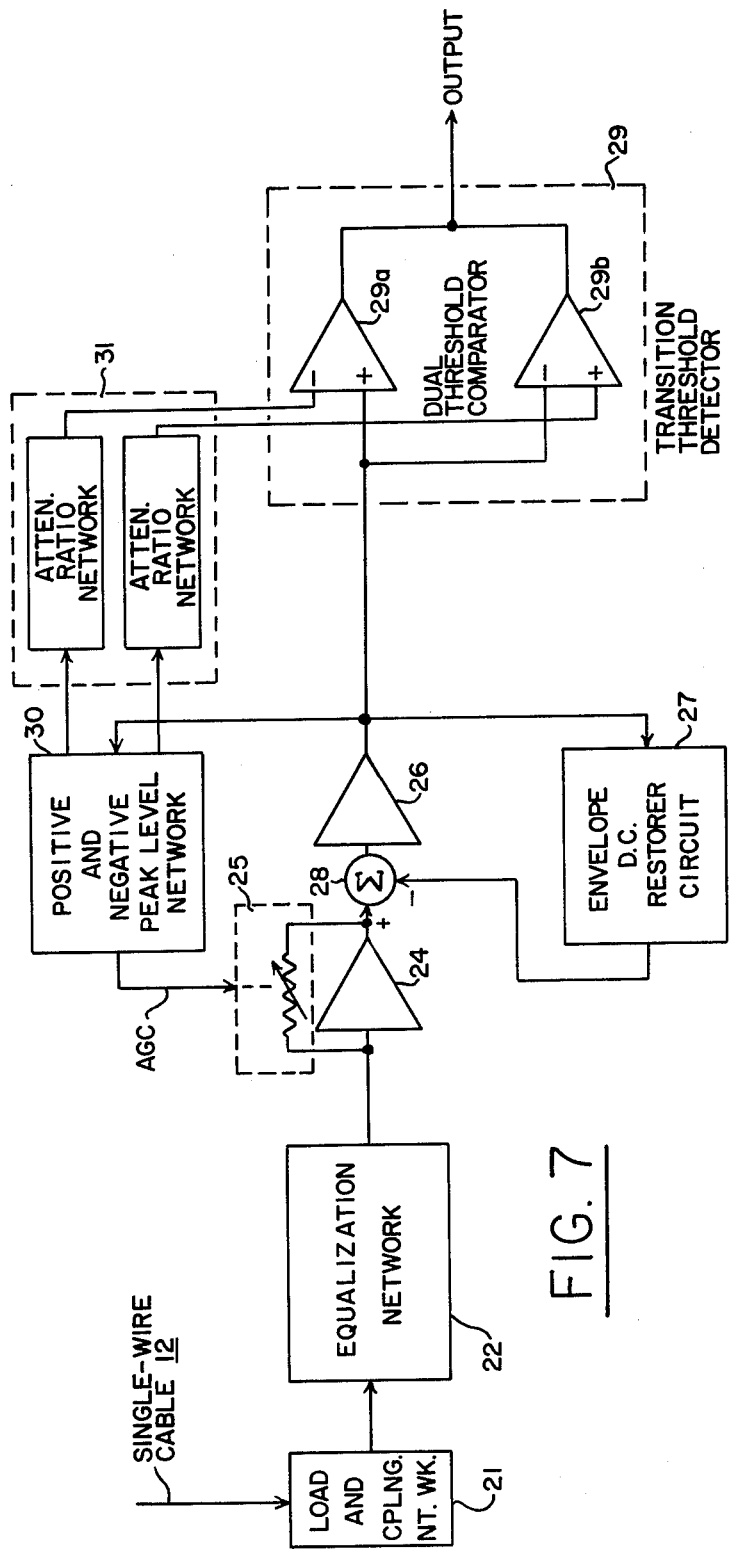
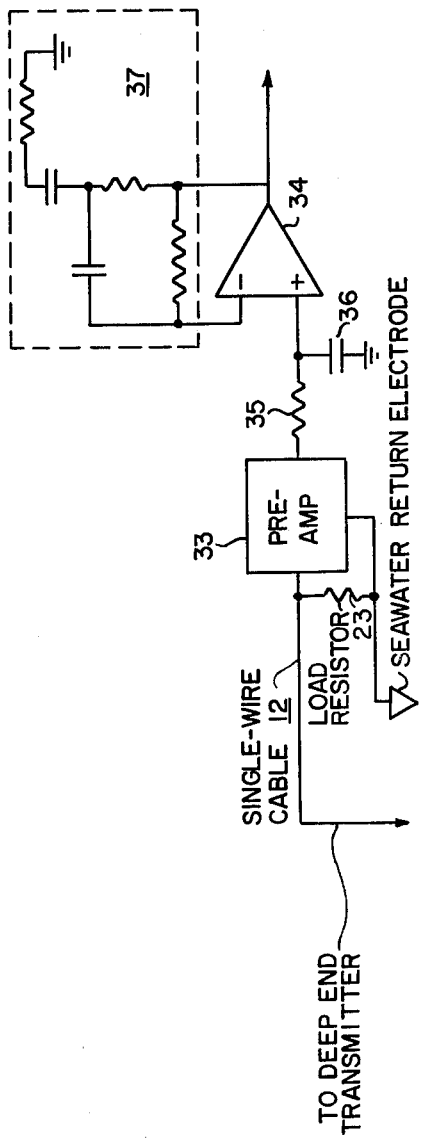
FIG. 7
FIG. 8

SYSTEM FOR PULSE DATA TRANSMISSION THROUGH WATER-RETURN CABLES

BACKGROUND OF THE INVENTION

This invention relates to a method and apparatus for pulse data transmission through water return cables, and more particularly for such cables payed out to a selectable length within a predetermined range from a coil in an open pack attached to an electronic package with a substantial portion of the cable remaining coiled in the pack.

A sonobuoy is a typical instrumentation system which may employ the present invention to great advantage. Sonobuoys were developed as submarine detectors to be dropped from aircraft, or otherwise deployed in the ocean, but the present invention is not limited to submarine detection applications. It is applicable to any instrumentation system for commercial or scientific applications, such as oil exploration. Consequently, although the present invention will be described in a specific embodiment with reference to a sonobuoy, it is not intended that the claims be construed as limited to a sonobuoy.

An air-dropped sonobuoy assembly is comprised of a battery-equipped and weighted instrumentation package. Attached directly to the package is a cable pack which pays out a single-wire cable until the desired depth is reached. The payed out portion of the cable between the buoy and the cable pack is selectable over a wide range (e.g., 4,000 to 16,000 feet) and may be determined by a clock in the instrumentation package which begins operation when the batteries are activated by sea water, thus establishing the depth of the instrumentation package from predetermined rate of descent data. Alternatively, a pressure transducer in the instrumentation package may be used to sense the desired depth pressure and stop the cable pack from paying out additional cable. In either case, there is usually a significant length of coiled cable remaining in the pack.

This practice of providing sufficient cable for a wide range of depths presents two significant problems. The first problem is to provide a means for terminating the process of paying out cable. The second problem is to provide a means for bypassing the coiled cable remaining in the pack. A solution to this second problem is significant because transmission through the coiled portion of the remaining cable, plus the payed out length of cable, may require an extremely elaborate and expensive electronic transmitter and receiver to compensate for the poor frequency response and distortion of the coiled cable in the pack. Experience has demonstrated that typical pulse data transmission through the coiled cable in the pack is too complex and costly to develop for the contingency of most of the cable remaining in a coil inside the pack and very little payed out. It is preferable to simply bypass the coiled cable in the pack.

One electrical-bypass technique for solving the second problem is to mechanically penetrate the cable to achieve electrical contact while maintaining electrical isolation from the water with a pressure seal. Mechanical penetration with electrical isolation from water must be achieved as an automated process. That poses yet another problem. The significance of this other problem can be appreciated when it is considered that the return path for the signal transmitted over the cable is through the ocean water and it is recognized that undesirable electrical leakage current from the insulated conductor to the water at the point of penetration will short circuit the signal cable, or greatly increase power expenditure, and also quickly erode the conductor and/or penetrator by electrolysis.

OBJECTS AND SUMMARY OF THE INVENTION

An object of the invention is to provide for transmitting pulses between two points through a single-wire cable not fully payed out from coil in a cable pack without transmitting through the coiled cable remaining in the pack.

Another object is to equalize the frequency response of the cable over a wide range of cable lengths using a fixed equalization network.

These and other objects of the invention are achieved in an exemplary embodiment for transmitting a data pulse train of predetermined pulse repetition rate, and utilizing a toroid core surrounding the cable near the pack to inductively couple the data pulses through turns of a primary winding on the core. The cable itself serves as a single-turn secondary winding of a pulse transformer. The stray capacitance between the water and the cable remaining coiled in the pack provides a return coupling through the water. At the receiving end of the cable, the data pulses, which have been distorted by the transmission length of the cable, are passed through linear equalization means for restoring the shape of the original data pulses as much as possible, and then detected by a dual-level threshold detecting means. The detected pulses are then employed to synthesize the data pulse train at the receiver. The equalization means compensates for the amplitude-frequency characteristics of the cable of nominal length within a predetermined wide range.

The novel features of the invention are set forth with particularity in the appended claims. The invention will best be understood from the following description when read in conjunction with the accompanying drawings.

BRIEF DESCRIPTION OF THE DRAWINGS

FIG. 7 is a block diagram of a receiver having an equalizer and dual threshold detector in the buoy of FIG. 1.

FIG. 8 is a circuit diagram of an exemplary equalization network.

DESCRIPTION OF PREFERRED EMBODIMENTS

Figure 1:
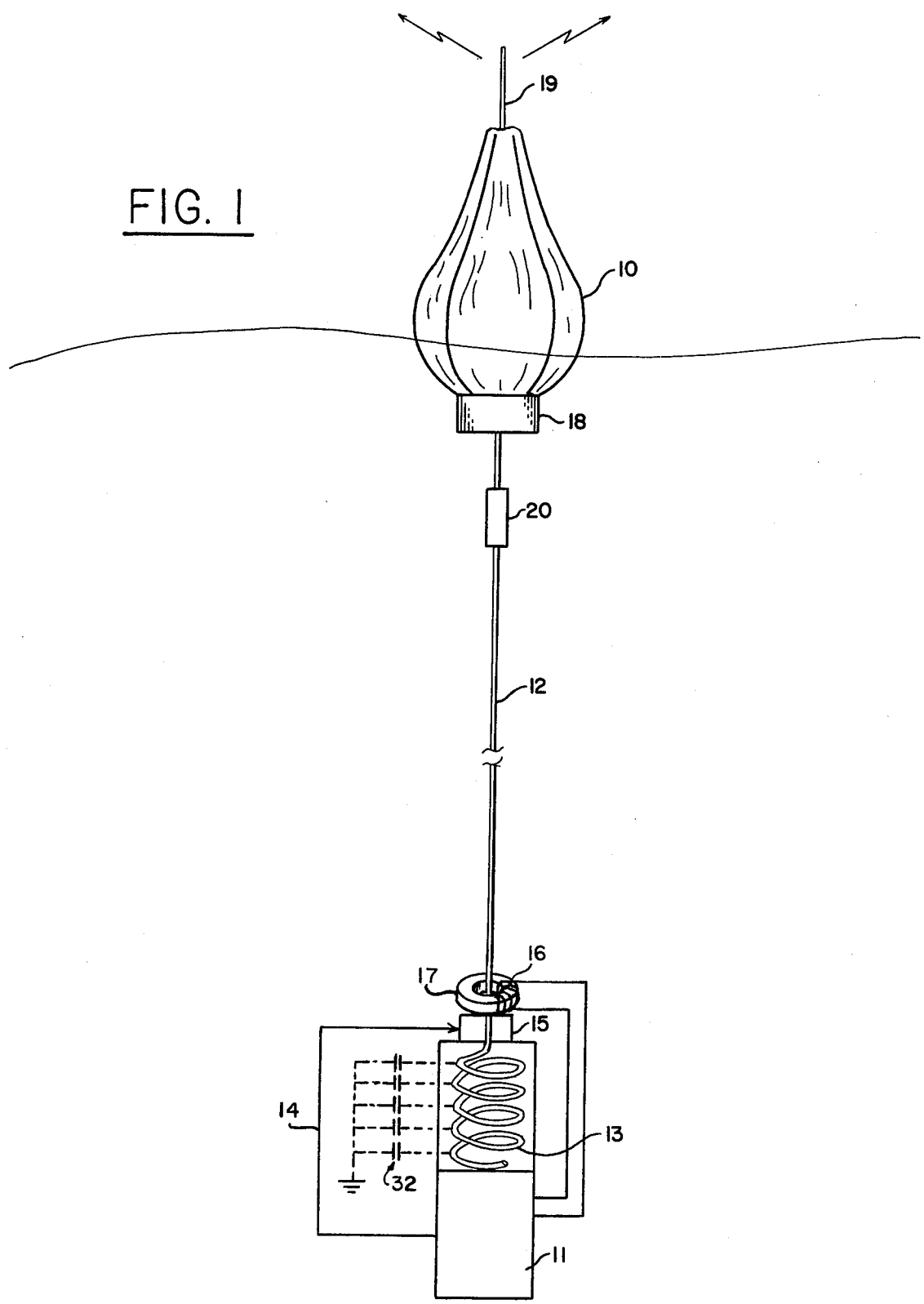
FIG. 1 is a schematic diagram illustrating the concepts of the present invention applied to a sonobuoy.

Referring now to FIG. 1 of the drawings, a buoy 10 is shown deposited or deployed in a body of water with an electronic instrumentation package 11, such as an acoustical detection system, for transmitting through an insulated single-wire cable 12, data in respect to sounds detected by a hydrophone. The cable is payed out from a coil pack 13 as the package 11 descends to the desired range which may be specified over a wide range (e.g., 4,000 to 16,000 feet).

The package 11 contains seawater-activated batteries which not only energize electronic circuits for transmitting data to the buoy through the cable, but also energize circuits for selecting the depth (payed-out cable length) according to some predetermined criteria, such as descending time after energization or water (depth) pressure. Once the payed-out cable length is selected, an insulated brake lead 14 is energized to actuate a braking mechanism 15, which in turn clamps the cable and prevents further cable pay-out.

When the electronic package 11 comes to rest, it may begin transmitting information-coded data pulses inductively coupled into the cable through a primary winding 16 on a toroid core 17 surrounding the cable. The cable itself acts as a secondary winding of one turn to effectively connect the payed-out cable directly to the signal output of the package 11. In that manner, signals transmitted to a receiver/transmitter 18 at the buoy bypass the remaining cable in the pack 13. The receiver amplifies, equalizes and detects the transmitted data pulses, and the detected pulses are used to resynthesize the data pulses which may then be recoded for transmission through an antenna 19.

A motion isolator 20 near the buoy allows the buoy to rise and fall with the ocean waves without disturbing the electronic package and cable pack. The inertia of that mass, plus the mass of the payed-out cable, will maintain the height of the electronic package above the ocean floor (i.e., the nominal depth below the water surface) substantially constant. The motion isolator may, in practice, be comprised of a coil of cable wound around an elastic link. Each end of the coil is secured to the elastic link so that as the elastic link stretches, the coil of cable expands. This expansion will not materially affect the frequency response of the cable.

The arrangement and operation of the cable pack 13, braking mechanism 15 and the motion isolator 20 are not part of the invention, only part of the environment for the invention, and will therefore not be described. The invention itself, which relates to transmitting the data pulse train through a single-wire cable payed out from a cable pack and to utilizing the toroid core of magnetic material to couple the transmitted pulses into the single-wire cable, will be described with reference to the remaining figures.

The toroid core 17 with primary winding 16, and the cable 12 functioning as a secondary winding, is effectively an electrical transformer. The frequency spectrum required to be handled by this transformer is that of the signal spectrum to be transmitted. It is well known that transformers have limitations on the range of frequency spectrum that can be handled, and that frequencies below some minimum, including direct current (DC), cannot be effectively transmitted by the transformer. Similarly, due to design parameters such as core losses, copper losses, leakage inductance, frequencies above some maximum frequency cannot be effectively transmitted by the transformer, although tradeoffs can be made to improve high frequency response at the expense of low frequency response, and vice versa. Certain transformer designs, such as the toroid transformer with high quality core composition, can be made to transmit a relatively wide frequency spectrum although some low frequency and high frequency limitation will still exist using the toroid transformer.

Figure 2:
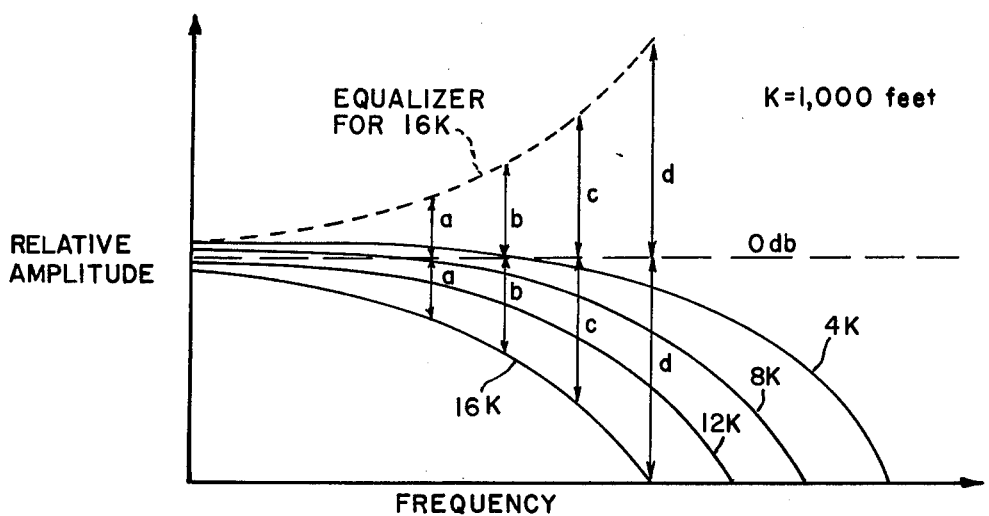
FIG. 2 shows a monotonically decreasing function of frequency exhibited by a straight single wire cable of different lengths utilizing water as a return circuit path.
Figure 3:
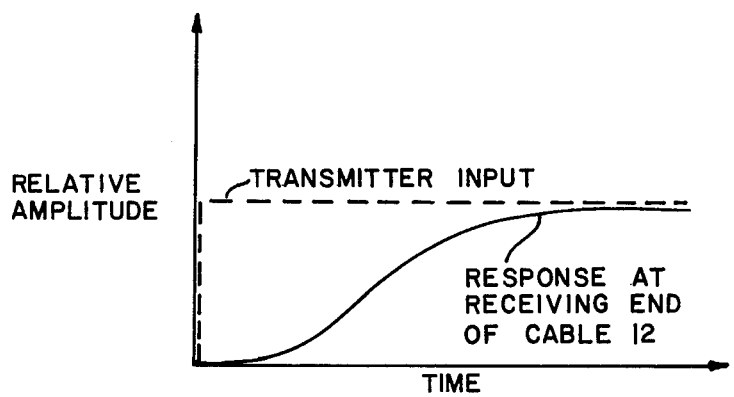
FIG. 3 illustrates the transient response of a cable to an electrical voltage step function.

Referring to FIG. 2, which shows a monotonically decreasing function of frequency exhibited by various lengths of payed-out cable, it is evident that for such a monotonically decreasing function of frequency, the transient response to a step function also exhibits a monotonic function in time as shown in FIG. 3. This response, although exhibiting considerable potential for intersymbol interference, has the desirable properties of no "ringing" and a maximum value of slope associated with each binary signal level transition of a pulse transmitted. This latter property is responsible for what has been experimentally observed, namely, that each transition results in a reversal in the slope of the waveform at the receiving end of the cable. However, when the coil pack is connected to the cable at one end (the transmitting end), transmission through the composite coil pack and cable will cause the monotonic characteristic of FIG. 2 to have peaks and valleys known as frequency resonances. Furthermore, instead of being monotonic, the response of the coil pack and cable will have damped oscillations (ringing) introduced. Therefore, it is necessary to include a highly complicated electronic equalizer in the receiver at the buoy to compensate for the damped oscillations introduced by the coil pack. Such a complicated electronic equalizer is beyond the realm of practical and economic design considerations.

Figure 4:
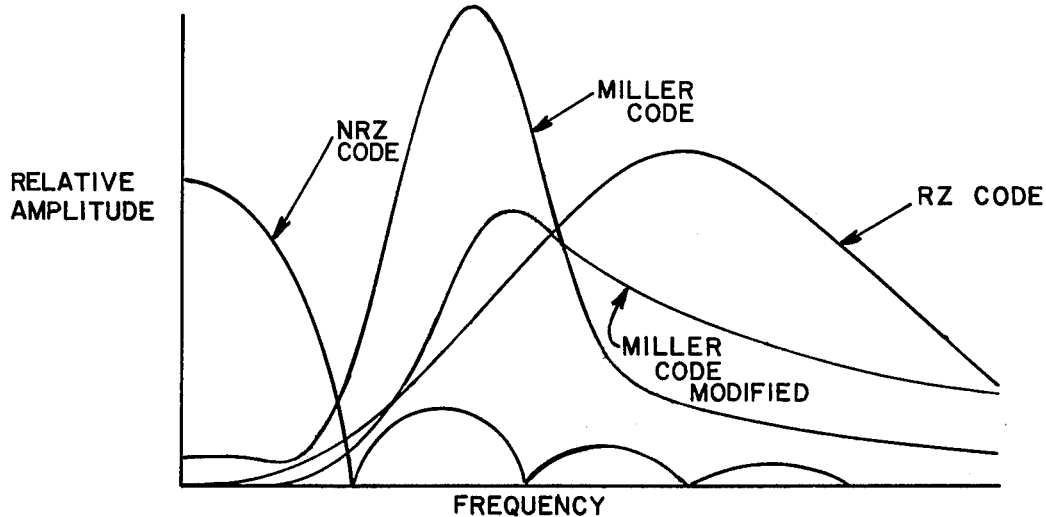
FIG. 4 is a graph comparing the frequency response of a Miller code waveform with NRZ and RZ code waveforms.

FIG. 4 shows the frequency power spectrum for a random binary code sequence using several different coding techniques. A non-return to zero (NRZ) code has the undesirable characteristic for this application of the peak spectrum occurring near zero frequency, and significant components of the spectrum would be lost due to low frequency limitations of the transformer. A return-to-zero (RZ) has no zero frequency component, and would be ideal for transformer coupling. However most of its power spectrum is found in the high frequency range which may be beyond the capability of the cable's frequency response depending on the required transmission rate. A Miller code has the desirable properties of confining the main portion of the spectrum at a lower frequency than the RZ code, and has very little spectrum near zero frequency. If the information rate capability of the system is to be optimized, this method of coding is preferred.

In any application where a very low bit rate is to be transmitted, the toroid transformer cannot effectively couple the RZ or Miller code because of its low frequency limitation. In such an application, the RZ or the Miller code would be modified in such a manner as to create a pulse at the positive and negative transitions of the original binary waveform. These pulses, which mark the transitions, are at a higher frequency and are therefore readily coupled by the transformer into the cable.

Figure 5:
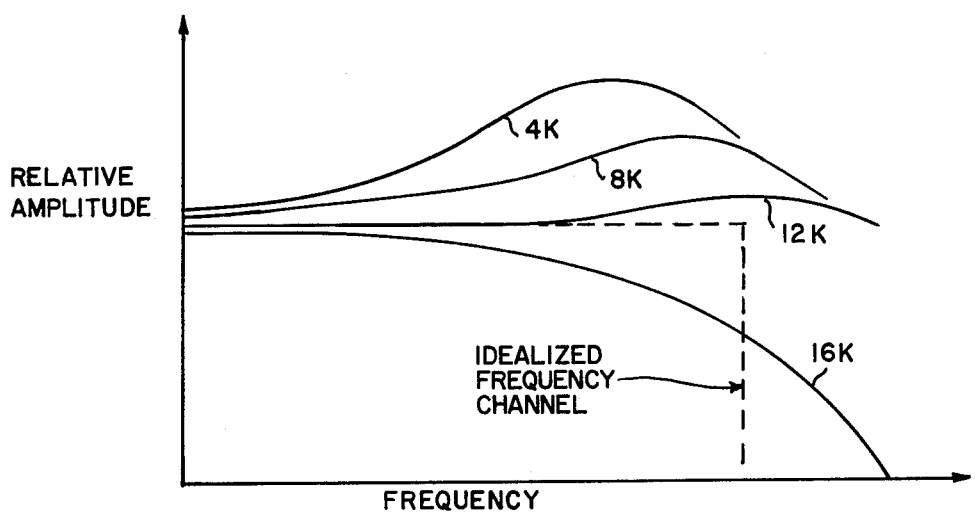
FIG. 5 is a graph illustrating the amplitude-frequency characteristic of a single-wire cable of variable length over a predetermined range with an equalization network for a nominal cable length of 12K feet.

The preferred coding technique for this exemplary embodiment is the Miller code because of its minimal low frequency content, which cannot be coupled by the toroid transformer into the single-wire cable, and its minimal high frequency content, which is limited by the cable response. According to the Miller code, described by M. Hecht, et al., in an article titled "Delay Mod Mark Coding" (*Proce IEEE*, Vol. 57, 1969), the data waveform changes signal voltage level at the midpoint between successive clock periods when a bit 1 is coded, and at the end of a clock period when a bit 0 is coded, unless a bit 1 follows a bit 0, in which case no transition occurs for the bit 0. This in itself will increase the high frequency content of the signal to be transmitted relative to non-return to zero (NRZ) coding, but decrease the high frequency content relative to return to zero (RZ) coding. If the data rate used is very low, such that an appreciable part of the spectrum could not be handled by the low frequency cut-off of the toroid transformer, the data pulse train is modified, as just noted herein before, by producing a pulse for each transition. The high frequency content is thus further increased for operation relative to the spectrum that is within the Miller code frequency range, as shown by the modified Miller code in FIG. 4. This simplifies the equalization required at the receiver to improve the shape of the pulses in the received waveform for the purpose of detecting data pulses by threshold detection and clocked resynchronization. Before describing the equalizer and threshold detector arrangement with reference to FIGS. 7 and 8, the nature of the compensation introduced by the equalizer will be discussed with reference to FIGS. 2, 5 and 6. FIG. 2 shows the response characteristics of cable that is 4K, 8K, 12K and 16K feet, and also implies the equalization required (as shown in dotted line) for a flat (0db) response through the entire frequency range of interest at the maximum cable length of 16K feet. Such an equalization will obviously overcompensate at the shorter lengths. It has been discovered that a single fixed equalizer designed for near optimum at some intermediate length of the entire range of 4K to 16K, such as at 12K, will overcompensate at shorter lengths by a tolerable amount, and undercompensate for longer lengths by a tolerable amount, as shown in FIG. 5.

For applications requiring a greater range, such as 4K to 32K feet, it would be feasible to provide an equalizer with a two-value variable network. With such a variable network set for 12K feet (such as two-value resistor or capacitor) all lengths from 4K to 16K would be compensated, and with the variable network set for 28K feet, all lengths from 16K to 32K would be compensated. Still in other applications of the more limited range of 4K to 16K feet, it may be desirable to provide an equalizer with a two-value variable network which provides optimum compensation for lengths of 7K and 13K, thus providing greater compensation over the entire range from 4K to 16K. At each setting, however, there is provided a fixed equalizer which compensates over a predetermined range with near optimum compensation for a cable length about two-thirds from the lower to the upper range limits.

Figure 6:
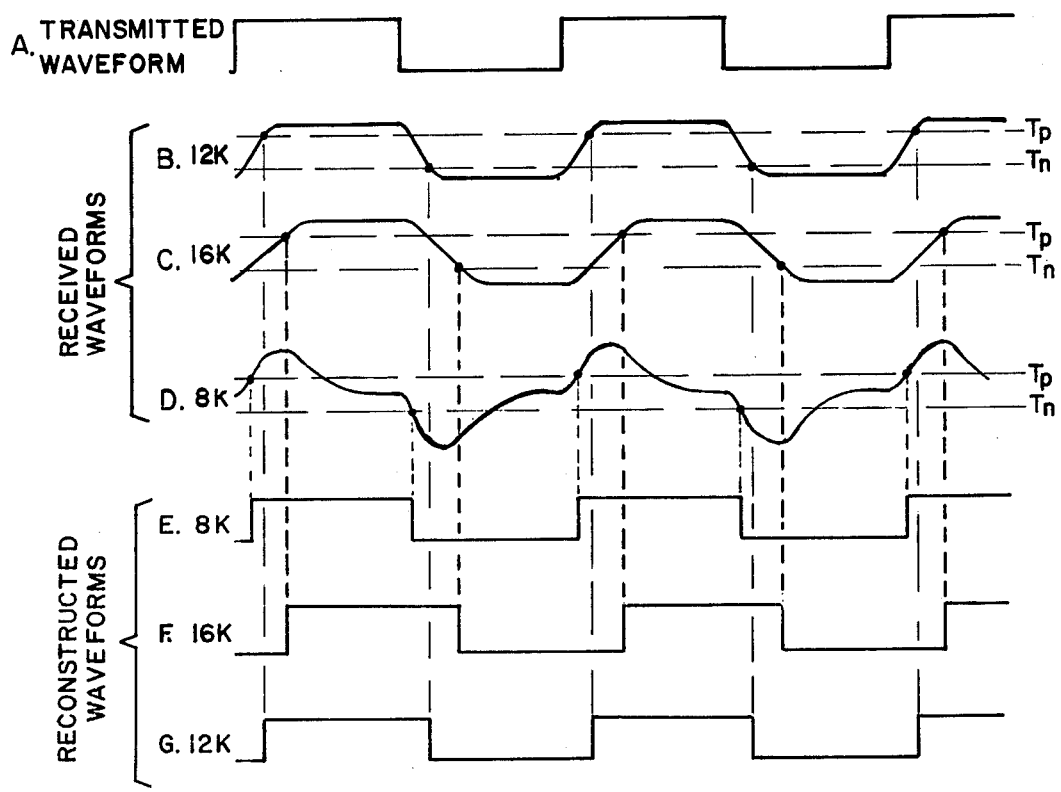
FIG. 6 illustrates the received waveforms of a data pulse train for the characteristics shown in FIG. 5.

FIG. 6 illustrates the effects of under-compensation and overcompensation. In waveform A there is illustrated a data pulse train as transmitted from the coil pack end of the cable, but without passing through the coil pack. Waveform B illustrates the pulse train received over a length of 12K feet with near optimum compensation provided by a fixed equalizer as shown in FIG. 5. Waveform C illustrates the received pulse train with under-compensation, and waveform D illustrates the received pulse train with overcompensation, as shown in FIG. 5. In each instance, the linear delay component for the transmission channel is assumed to be zero in FIG. 5 since it is only the extent of distortion in the received pulses vis-a-vis the transitted pulses that is of any concern. The distortion in waveform B is minimal so that reliable detection of the data pulses does not present a problem. Distortion in waveform C is greater, due to undercompensation of the high frequencies, but detection still would not present a problem, particularly if dual threshold detection is employed, as illustrated. In the case of overcompensation, distortion of the data pulses is greater, as shown in waveform D, but since the overcompensation is greater at the higher frequencies, the effect is to over-emphasize the leading and trailing ends of each pulse, i.e., to overemphasize the transitions used to detect and reconstruct the input waveform pulses. The result of this effect is to make pulse detection and reconstruction easier. Waveform E illustrates the reconstructed waveform for the case of the cable only 8K feet, and waveforms F and G illustrate the reconstructed waveforms for the cable at the respective lengths of 16K and 12K feet. The latter inherently departs more from the input waveform than the former. For that reason, the near optimum compensation is selected for a cable length that is closer to the upper limit than to the lower limit.

The organization of an exemplary equalizer and threshold detector will now be described with reference to the block diagram of FIG. 7.

The conductor of the single-wire cable 12 is connected to a load and coupling network 21 designed for termination of the line with a resistor 23 shown in FIG. 8. The output of that network is connected to a gain and compensation network 22 comprised of a preamplifier and an equalizer. The latter may be a passive or active network with a frequency response as shown in FIG. 5 for near optimum compensation at 12K feet.

The output of the equalizer is coupled to an operational amplifier 24. Automatic gain control may be introduced at this point through a variable resistance element 25 (e.g., a field-effect transistor) controlled from the output of a second amplifier 26, as shown, or at the input of the preamplifier in the network 22 through a signal variable attenuator. The output of the second amplifier may be subtracted from the output of the first amplifier through an envelope and DC restorer 27 (comprising a rectifier and low-pass filter) and a summing circuit 28 in order to maintain constant the DC reference of the signal being processed by a dual threshold detector 29 since any DC drift will only make threshold detection more difficult, and in extreme cases impossible. However, other techniques may be employed to stabilize the DC component of the signal.

The output of the second amplifier 26 is dual threshold detected, either with a comparator having a designed hysteresis or, as shown, with two threshold detectors 29a, 29b, one for positive threshold level $T_p$ and one for a negative threshold level $T_n$ shown in FIG. 6. The output of the amplifier 26 is also processed by a positive and negative peak level network 30 comprising positive and negative peak detectors. Each peak detector in the network 30 is comprised of a full-wave rectifier followed by a low-pass filter to provide a signal representing a running average of the positive and negative peaks. The absolute values of these signals are then combined to provide the AGC signal, and the separate values of these signals are separately attenuated in network 31 to provide the two threshold levels $T_p$ and $T_n$ shown in FIG. 6. The AGC signal may be derived from the output of the amplifier 26 in a more direct manner by rectifying, lowpass filtering and amplifying the output of that amplifier since the function of the AGC is only to provide more nearly uniform peak amplitudes, while the function of the dual threshold detector is to provide more certain identification of the transitions of the received data pulse train. The data of the original binary waveform may be extracted from the detected waveform in the receiver in order to biphase modulate a carrier for retransmission to a remote location. In some applications there may be some provision for processing before retransmission.

Imperfect signal equalization may be tolerated as long as binary levels can be detected within ±¼ clock period of a local phase-locked clock in which the local clock is derived from the detected data pulses transitions using a phase-locked averaging loop. The pulse resynchronizer is optimized, based on the maximum likelihood decision principle. The Miller code can consist of only two possibilities regarding idealized transitions from 1 to 0 or 0 to 1, namely (1) transitions occuring at a reference clock point, and (2) transitions occurring between reference clock points. Consequently the Miller code can be reestablished by a gating signal of a half clock period width centered on the clock midpoint. Adjustment of the phase-locked loop for the local clock and associated circuitry may be such that the detected waveform will ideally have the transition edges exactly in the center of this gating signal. To reestablish the Miller code, the rule is then simply to generate a transition at exactly the local clock midpoint if the signal has a transition within the mid-point corridor, and to generate a transition at exactly the local clock reference edge if the incoming signal has a transition within the midpoint corridor of a gating signal that is the binary complement of the previously described gating signal. In that manner the Miller code binary waveform which is received and dual-threshold detected is reestablished with virtually no phase shift.

The method and apparatus for pulse data transmission through a single-wire cable described with reference to FIG. 1 of the drawings depends upon the coiled cable in the cable pack being coupled to circuit ground (water) for a return signal from the receiver at the buoy. To that end reliance may be placed on the stray capacitance 32 of the cable remaining in the coil pack, as shown, since the coil pack will be filled with water.

Referring to FIG. 8, the equalization network will typically be implemented with a preamplifier 33 coupled to the non-inverting input terminal of an operational amplifier 34 by a resistor 35 and filter capacitor 36. The output terminal of the operational amplifier 34 is coupled to its inverting input terminal by a feedback compensation network 37 designed for the particular application using small capacitors and resistors in the arrangement shown at a pulse rate of about 100 KHz, i.e., for pulses not exceeding 20 μsec. A lower rate, such as 10 KHz would involve 100 μsec pulses which can not be easily coupled into the line using a toroid transformer in accordance with the present invention. In this instance, the low rate code may be modified by transmitting a narrow pulse at each transition. For this exemplary application, the toroid core is made of 1-mil tape 1.5 inches wide with an internal diameter of ⅜ inch and an outside diameter of 1.5 inches. The tape is preferably made of an alloy comprised of 80% nickle and 20% steel. The relative permeability of the core is approximately 130,000, and eight turns of the primary winding are provided for a primary to secondary turn ratio of 8 to 1.

It is common practice to pack the turns of the coiled cable very tightly and in such a way that as each turn is payed out from the inside of the coil, it is pulled from the coil toward the center and fed out through a concentric guide at the top of the pack. (The toroid 17 is secured to the guide.) Because of this tight packing, the cable may prevent the water from wetting all of the turns of the cable remaining in the pack, particularly when a viscous material is coated on the cable to help keep each turn in place until pulled off as cable is payed out. That reduces the capacitive coupling to circuit ground relied upon, except at depths where the water pressure is sufficient to assure wetting all of the turns remaining in the pack. Consequently, to assure a good capacitive coupling to circuit ground, it may be necessary to prewet the turns of a coil pack by subjecting it to sufficient seawater depth pressure to prewet the turns of the packed cable prior to deploying the sonobuoy. Alternatively, a mechanism may be provided to penetrate the cable beween the pack output guide and the toroid 17 after the braking mechanism has stopped descent. A conductive plate mounted outside of the pack may be connected to the penetrator to provide a DC connection to circuit ground.

Although particular embodiments of the invention have been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are defined as follows:

1. A method for transmitting pulses between two points in a body of water through a single-wire cable with return current through the water comprising the steps of
    providing capacitive coupling of said cable to said body of water at the transmission end thereof, and
    inductively coupling said pulses from a signal line into said cable through a toroid core surrounding said cable with a number of turns of said signal line around said toroid.

2. The method of claim 1 wherein said pulses are representative of binary data, where said data is comprised of a train of pulses.

3. The method of claim 2 wherein said train of transmitted pulses mark every positive and negative transition of said binary data.

4. A method for transmitting data pulses over a single-wire, water-return cable in a body of water, where said cable is payed out to a selected length within a predetermined range from a coil in a cable pack immersed in said water, by inductively coupling said data pulses into said cable through a toroid core of magnetic material surrounding said cable in a position near said pack using a signal line wound a number of times around said toroid.

5. A method as defined in claim 4 including the step of providing fixed compensation of the amplitude response of said cable at high frequencies to produce very nearly flat response over a predetermined frequency range for a length of cable payed out closer to the upper limit of said range than to said lower limit.

6. A method as defined in claim 5 wherein said fixed compensation is for a length of cable payed out about two thirds of said range.

7. A method for transmitting data pulses over a single-wire, water-return cable in a body of water, where said cable is payed out to a selected length within a predetermined range from a coil in a cable pack immersed in said water, by providing a return current path for said data pulses through said water to effectively shunt said cable remaining in said coiled pack, transmitting said pulses over said single wire, and equalizing said pulses received at the opposite end of said wire using a fixed network for compensating the amplitude response of said cable at high frequencies for a cable length within said predetermined range closer to said upper limit than to said lower limit.

8. Apparatus for transmitting pulses from a package in a body of water to a receiver through a single-wire cable payed out from a coil in an open pack immersed in said body of water with return current through said body of water comprising a toroid core surrounding said payed-out cable near said open pack and a primary winding inductively coupling said pulses from said package into said cable through said toroid core, said primary winding having a number of turns around said core.

9. Apparatus for transmitting data pulses over a single-wire, water-return cable in a body of water, where said cable is payed out to a selected length within a predetermined range from a coil in a cable pack immersed in said water, comprising means for inductively coupling said data pulses into said cable, and means for providing fixed compensation of the amplitude response of said cable over a predetermined frequency range for a length of cable payed out to a length closer to the upper limit than to the lower limit of said range.

10. Apparatus as defined in claim 9 wherein said fixed compensation is nominally designed for a length of cable payed out about two thirds of said range.

11. Apparatus for transmitting data pulses over a single-wire, water-return cable in a body of water, where said cable is payed out to a selected length within a predetermined range from a coil in a cable pack immersed in said water, comprising means for providing a return current path for said data pulses through said water that effectively shunts said cable remaining in said coiled pack, means for transmitting said pulses over said single wire, and means for equalizing said pulses received at the opposite end of said wire using a fixed network for compensating the amplitude response of said cable at high frequencies for a cable length within said predetermined range closer to said upper limit than to said lower limit.

12. Apparatus as defined in claim 11 wherein said fixed compensation is nominally designed for a length of cable payed out about two thirds of said range.

* * * * *